United States Patent [19]

Koblanski

[11] 4,308,006

[45] Dec. 29, 1981

[54] METHOD AND APPARATUS FOR ATOMIZING AND BURNING LIQUID HYDROCARBONS FLOATING ON WATER

[75] Inventor: John N. Koblanski, Burnaby, Canada

[73] Assignee: Ocean Ecology Ltd., Edmonton, Canada

[21] Appl. No.: 118,154

[22] Filed: Feb. 4, 1980

Related U.S. Application Data

[63] Continuation-in-part of Ser. No. 948,922, Oct. 5, 1978, abandoned.

[51] Int. Cl.³ .................................................. F23C 11/02
[52] U.S. Cl. ............................................ 431/1; 431/2; 431/8; 431/202; 210/748; 210/923
[58] Field of Search .......................... 431/1, 2, 8, 202; 210/922, 923, 925, 748

[56] References Cited

U.S. PATENT DOCUMENTS

| | | | |
|---|---|---|---|
| 3,255,571 | 6/1966 | Walker et al. | 55/9 |
| 3,416,870 | 12/1968 | Wright | 431/2 |
| 3,586,469 | 6/1971 | Molin et al. | 431/8 |
| 3,663,149 | 5/1972 | Heagler | 431/2 |
| 3,707,230 | 12/1972 | Davidson | 210/284 |
| 3,865,722 | 2/1975 | Stoddard | 210/922 |
| 4,032,438 | 6/1977 | Koblanski | 210/922 |
| 4,165,961 | 8/1979 | Yamamoto et al. | 431/1 |

FOREIGN PATENT DOCUMENTS 972302 10/1964 United Kingdom .................... 431/2

*Primary Examiner*—Samuel Scott
*Assistant Examiner*—Lee E. Barrett
*Attorney, Agent, or Firm*—Townsend and Townsend

[57] ABSTRACT

Oil or other combustible material polluting the sea is burned by apparatus having a partly submergible burner equipped with a transducer for generating high frequency acoustic vibrations. The transducer is surmounted by a velocity transformer designed to concentrate the acoustic vibration at a region of maximum intensity adjacent an upper end of the transformer. A float arrangement on the burner allows buoyancy to be adjusted so that the upper end of the velocity transformer is disposed a suitable distance above the surface of the water. An ignition system on the burner projects upwardly above the velocity transformer to ignite a cloud of the oil which is vaporized over the apparatus by energization of the transducer.

8 Claims, 5 Drawing Figures

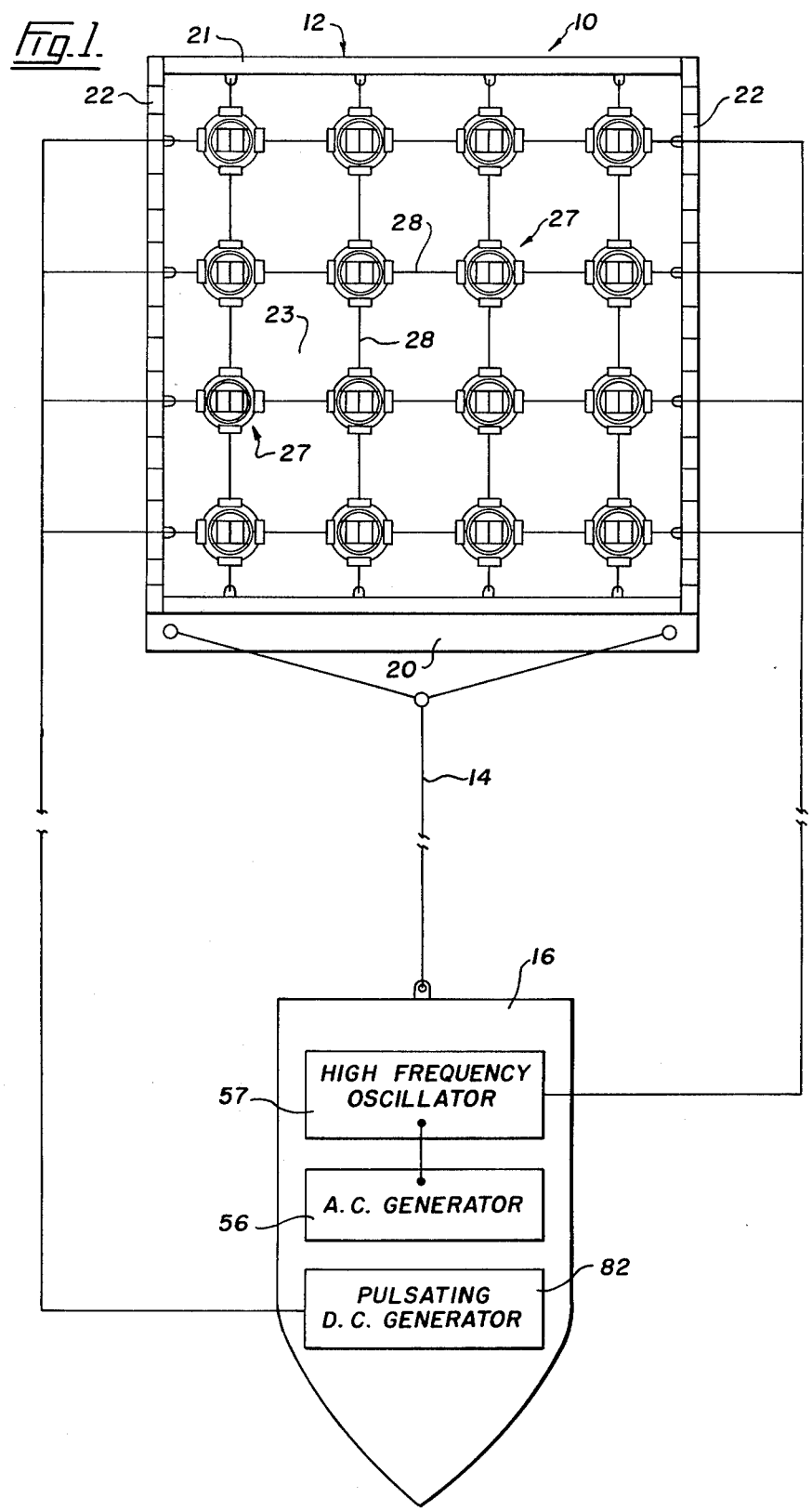

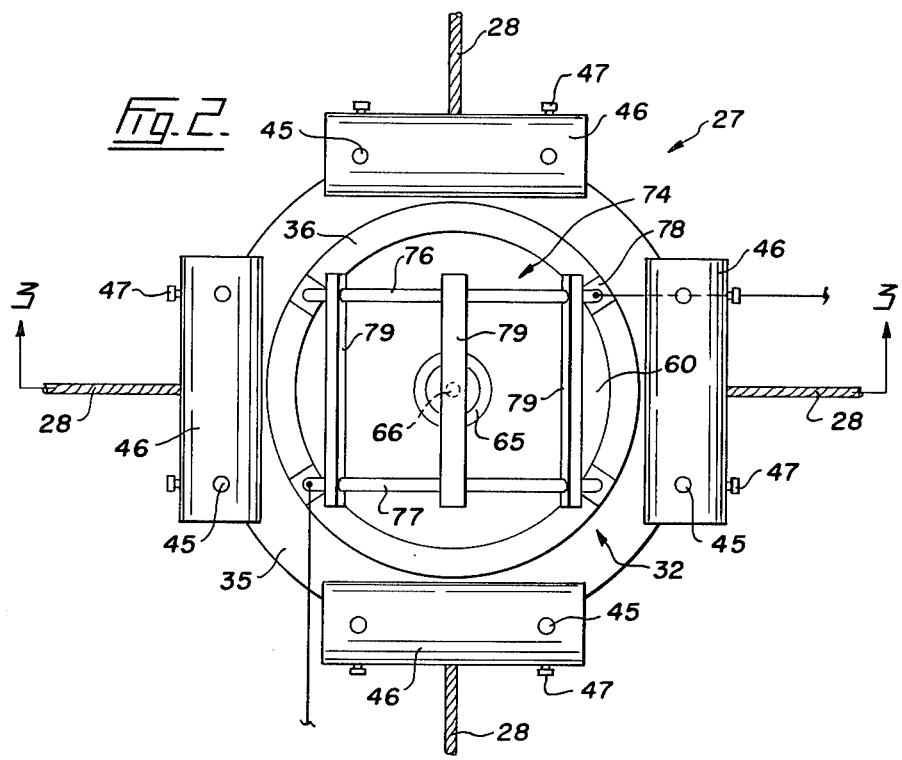
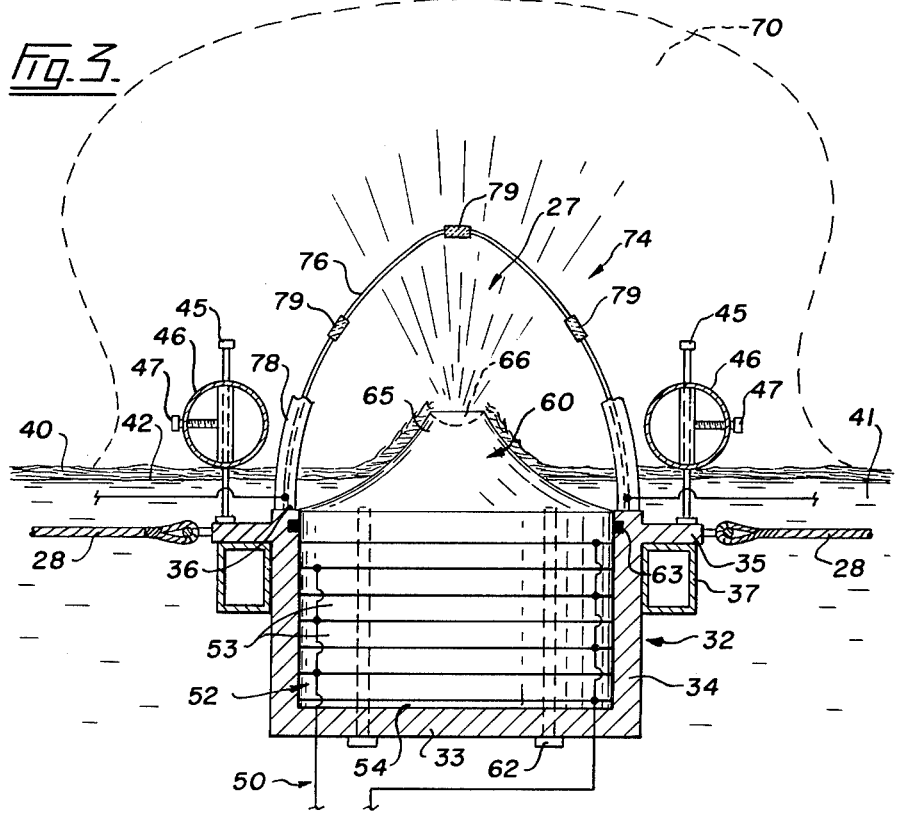

METHOD AND APPARATUS FOR ATOMIZING AND BURNING LIQUID HYDROCARBONS FLOATING ON WATER

CROSS REFERENCE TO RELATED APPLICATION

This is a Continuation-In-Part of application Ser. No. 948,922, filed Oct. 5, 1978 and now abandoned.

BACKGROUND OF THE INVENTION

The problem of cleaning up an oil spill in a harbour or near a coastline line is well known and a great variety of proposals have been made in vain attempts to offer solutions to the problem. One suggestion is to burn off the oil by dropping magnesium particles and then setting fire to the oil-magnesium mixture in the hope that sufficient heat will be generated to support combustion long enough to consume a reasonably large amount of the spilled oil. However, often there are such high thermal losses to the water and air that combustion cannot be maintained and the first soon dies out leaving the water polluted to a greater degree than before by the additional products of combustion and unburned magnesium particles.

SUMMARY OF THE INVENTION

The present invention achieves substantially complete combustion by using ultrasonic energy to atomize the oil prior to ignition so that substantially continuous burning takes place. To obtain this desirable result, the invention contemplates the use of apparatus for burning a liquid hydrocarbon such as oil floating on the surface of a body of water which comprises a burner having a body submergible in the water below the oil, sound generating means including a transducer carried by the body for producing high frequency acoustic vibrations, a velocity transformer carried by the body above the transducer for concentrating the acoustic vibrations at a region of maximum intensity adjacent an upper end of said transformer, means for adjusting the buoyancy of the body to maintain the region of maximum intensity above the surface of the water and the oil thereon, and an ignition system including a spark-producing device mounted on the body to project upwardly into igniting contact with a cloud of the oil atomized over the velocity transformer by operation of the ultrasound generating means.

The invention also contemplates a method for employing the apparatus.

BRIEF DESCRIPTION OF THE DRAWING

FIG. 1 is a schematic plan view of apparatus for atomizing and burning liquid hydrocarbons floating on water constructed in accordance with the present invention, FIG. 2 is a plan view of a burner forming part of the assembly shown in FIG. 1, FIG. 3 is a part elevation, part vertical section taken on the line 3—3 of FIG. 2.

DESCRIPTION OF THE PREFERRED EMBODIMENTS

Figure 4:
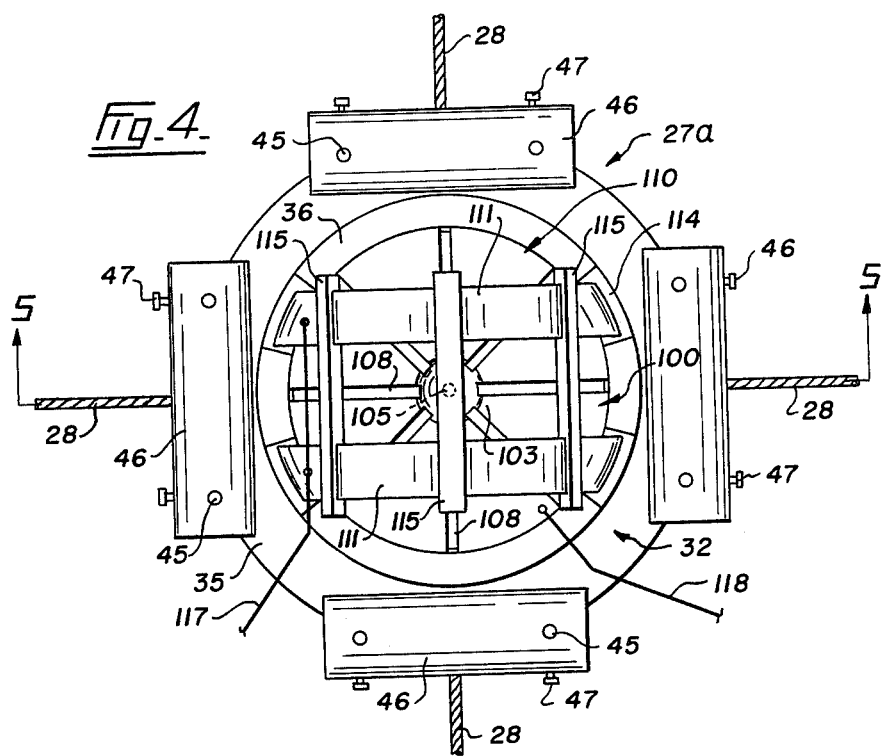
FIG. 4 is a plan view of another embodiment of the burner.

The numeral 10 indicates generally a preferred embodiment of the present invention which is constructed as a raft 12. A towline 14 connects the raft to a suitable boat 16 so that the assembly can be maneuvered back and forth through a floating oil slick in a clean-up operation.

The raft generally indicated at 12 is shown in FIG. 1 to comprise a four-sided rectangular structure formed of rigid front and rear members 20 and 21 which are joined together by flexible side members 22. These four members define a large open space 23 and the raft has neutral buoyancy so as normally to float just below the surface of the water. This arrangement allows oil or other contaminating substances which can be burned to move into the space 23 as the raft is towed through the water. The space 23 is occupied by a plurality of suitably spaced burners 27 which are secured to the members forming the raft 12 by means of a network of cables 28.

Referring now to FIGS. 2 and 3, each of the burners generally indicated at 27 will be seen to comprise an open-topped hollow body 32 having a bottom wall 33 and a cylindrical side wall 34. A horizontal and outwardly projecting flange 35 is provided near rim 36 of the body and, beneath this flange, a ring float 37 is supported. In FIG. 3, the numeral 40 represents a thin layer of oil which is polluting a body of water 41 having a surface represented by the numeral 42. The buoyancy provided by the float 37 is such that the rim 36 of the body normally is spaced a short distance below the water surface 42 as suggested in FIG. 3. Flange 35 is fitted with circumferentially spaced pair of rods 45 and, on each of these pairs of rods, a cylindrical float 46 is adjustably mounted. Clamping screws 47 are provided on the floats 46 to engage the rods 45 which arrangement allows the floats to be secured in a selected vertical position on their rods. Thus, a fine adjustment is provided which allows the spacing between the rim 36 and the water surface 42 to be regulated according to sea conditions, the type and amount of oil which must be burned, and whatever other factors might be involved in a particular clean-up operation.

Each burner 27 is provided with sound generating means which is generally indicated at 50. The means 50 is shown to include an ultrasonic transducer 52 formed of a plurality of piezoelectric ceramic plates 53, these circular or disc-like plates being housed within the body 32 to form a vertical column or sandwich. A pad 54 of a suitable sound-insulating material is interposed between the lowermost plate 53 and the bottom wall 33 of the body.

The sound generating means 50 also includes appropriate electrical devices carried aboard the boat 16, see FIG. 1 only, and a suitable circuit which connects these devices to the transducers 52. Devices which may be carried aboard the boat include an alternating current generator 56 and a high frequency oscillator 57 as well as the required switches and other controls which are not shown. Thus, the transducers 52 of the multitude of burners 27 carried within the raft 12 can be energized by alternating current supplied from the source aboard the boat whereby to propagate high-frequency acoustic vibrations.

The vibrational energy produced by each transducer 52 is increased in intensity by means of a velocity transformer 60 which is mounted in the body 32 over the uppermost plate 53. Preferably, bolts 62 extend to the bottom wall 33 and the several plates 53 to engage the circular base of the transformer 60. An O-ring 63 seals the circular base of the transformer to the hollow body near the rim 36. The velocity transformer 60 has a reduced upper end 65, the transformer being otherwise shaped to provide it with a vibrational antinode or region of maximum intensity indicated by the numeral 66. The upper end 65 is shown in FIG. 3 as being dished with the region 66 located in the center of this dished upper end. Alternatively, the upper end may be fitted with a head or the like (not shown) which will provide an elongated or channel-like configuration in which the region 66 is centered.

It will be noticed that the velocity transformer 60 projects upwardly through the water and oil, the upper end 65 being spaced a suitable distance above the water surface 42. This spacing is determined by adjustment of the floats 46 and may vary somewhat according to such factors as whether the water surface is rippled or smooth as well as the depth of the layer of oil and so on.

The above described structure is operable to vaporize the oil floating on the surface of the water so as to form a fog or cloud 70 which is assumed to be within the confines of the dotted line shown in FIG. 3. This cloud of atomized or vaporized oil is set on fire by an ignition system 74 which forms an essential part of the present invention.

The ignition system generally indicated at 74 is shown in FIGS. 2 and 3 as comprising a cathode 76 and an anode 77. These substantially wishbone-shaped electrodes are secured to the rim 36 of the submerged body by insulators 78, see particularly FIG. 3. The spaced-apart electrodes extend over the velocity transformer 35 and are interconnected by other insulating bars 79 as shown best in FIG. 2.

In order to energize the electrodes 76 and 77, the boat 16 is fitted with a pulsating direct current generator 82 (FIG. 1) and this generator is separately connected by a suitable circuit to the electrodes of each burner. The ignition system 74 when activated causes sparks to jump between adjacent electrodes and it is this sparking or arcing which ignites the cloud of oil.

To explain the operation of the apparatus 10, it will be assumed the boat 16 with the raft 12 in tow is being moved slowly through an oil slick to follow a pattern which eventually criss-crosses the entire polluted area. The sound generating means 50 is energized and the high intensity sound vibrations concentrated by the velocity transformer 60 at the region 66 causes the oil near the transformer to act in a peculiar manner. The intense vibrations within the velocity transformer appears to draw in the surrounding oil with relatively small amounts of water and moves the oil-water mixture up the side of the transformer into the dished upper end 65. Here the vibrations are so intense that the mixture is vaporized or atomized into fine particles which are driven upwardly to float over the burner as a low-lying cloud. Relatively course drops of oil are intermingled with the fine drops although the coarse drops appear to originate from the side of the transformer immediately below the upper end 65.

The formation of the several oil clouds which may join together is a signal for the operators of the apparatus 10 to start the ignition system 74. The intermittent sparking or arcing between the electrodes which results when the system 74 is energized causes the airborne oil cloud to burn while being continuously resupplied with vaporized oil from the oil slick.

Figure 5:
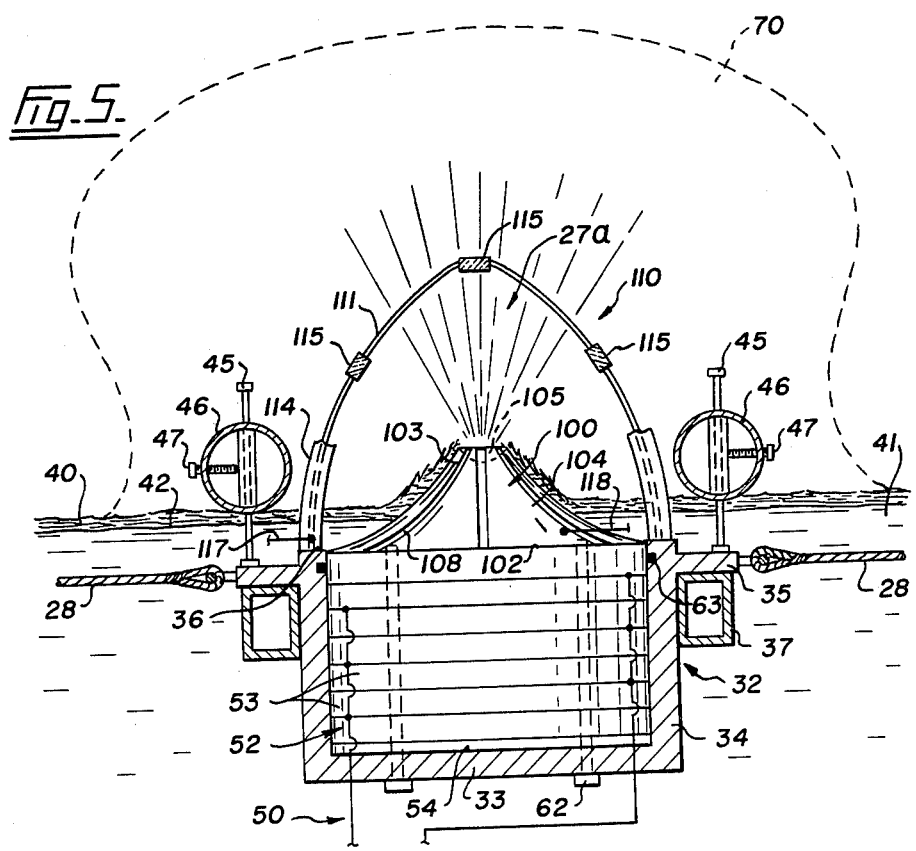
FIG. 5 is a part elevation, part vertical section taken on the line 5—5 of FIG. 4.

Referring now to FIGS. 4 and 5, the numeral 27a indicates generally a modified form of burner which can also be used by itself or assembled as a raft as described above. This embodiment of the burner is constructed mainly as previously described and, for convenience, like parts are designated by the same reference numerals. The burner 27a, however, is fitted with a velocity transformer generally indicated at 100. The transformer 100 is made of a metallic material such as titanium. Like the previously described transformer, the transformer 100 is generally conical so as to have a lower end 102, a relatively small upper end 103, and a tapered outer surface 104 which curves inwardly to a slight extent between the opposite ends of the transformer. The transformer 100 is supported within the body 32 with the larger lower end 102 in sound-transmitting contact with the uppermost plate 53 of the ultrasonic transducer 52. The smaller upper end 103 is dished to provide the transformer with a vibrational antinode or region of maximum intensity 105. On the outer surface 104, there is provided a suitable number of channels 108 which extend between the opposite ends of the velocity transformer. These channels 108 preferably are equidistantly spaced apart around the circumference of the velocity transformer and are square in cross section. Alternatively the channels may be semi-circular in cross section.

An ignition system 110 is provided for the burner 27a. FIGS. 4 and 5 show the system 110 as comprising a pair of electrodes 111 which are mounted on the body 32 to extend over the transformer 100. The electrodes 111 have a greater width than thickness and are substantially wishbone shaped as seen in FIG. 5. Insulating bars 114 enclose the lower ends of the electrodes 111 and similar bars 115 extend between and support the upper portions of the spaced-apart electrodes. The electrodes 111 are connected by a conductor 117 (FIG. 4) to the pulsating direct current generator 82 aboard the boat which tows the raft 12 made of an array of the burners 27a. Another conductor 118, see FIGS. 4 and 5, connects the velocity transformer 100 to the same power source. Thus, when the ignition system 110 is energized the electrodes 111 are charged with positive direct current while the transformer 100 is correspondingly charged with negative direct current.

The burners 27a equipped with the velocity transformers 100 may be operated in the previously described manner to consume an oil slick floating on a body of water. The high intensity sound vibrations resulting from the energization of the sound generating means 50 causes the transformer 100 to vibrate in unison and this exerts a propelling force which moves the adjoining oil and some water up the outer surface 104 of the transformer. The channels 108 increase the flow of oil being driven upwardly of the outer surface and it is possible for the transformer 100 to be positioned so as to project a greater distance above the surface of the water which is advantageous in forming the oil cloud 70. Also it is possible for the burner 27a to handle a variety of viscosities of oil. This would be done by providing the burner with a number of interchangeable transformers each with channels of a particular width and depth. A transformer is selected from a particular type of oil, for example if a very viscous oil was encountered, a transformer having correspondingly wide and deep channels is installed on the burner.

The oil approaching the top of the transformer and being deposited in the dished upper end thereof is atomized by the high intensity acoustical energy into an upwardly directed spray of fine particles which develops the fog 70. When the ignition system 110 is energized a very intensified sparking action develops between the negatively charged transformer 100 and the positively charged electrodes 111 and this ignites the oil fog. At the same time, an electrostatic field is developed between the transformer and the electrodes. This field is most intense near the transformer because of the mass and pointed shape of that member as compared to the electrodes and therefore the particles of oil become polarized as they are discharged upwardly from the transformer. In other words, the particles become negatively charged and this results in a further breakdown of the oil into still finer particles and also in a repelling force being developed which accelerates the upward drive of the atomized particles so that they reach an even greater height above the burner. The acoustic and electrostatic forces thus developed combine to reduce the oil to droplets which are fine enough to be readily ignited by the ignition system 110 with combustion being maintained by the same system. It has been found that the two sources of energy, acoustic and electrostatic, will initiate and maintain combustion in other inert materials as well as oil so that the present invention offers an effective solution to a number of pollution clean-up problems.

From the foregoing, it will be apparent the present invention provides an effective way of removing oil or other combustible and vaporized substances which may be polluting the ocean as a result of a shipwreck. The burning action can be sustained because of the very low heat loss both to the water and to the air. Since the vaporized cloud is not in direct contact with the water very little of the heat resulting from combustion is transferred to the sea and the cloud appears to insulate itself from the surrounding air to confine the heat of the fire to the immediate vicinity of the burner. A small amount of water is vaporized along with the oil and the fact that the oil cloud burns cleanly without the formation of undesirable amounts of soot is attributed to the presence of the moisture.

I claim:

1. Apparatus for burning a liquid hydrocarbon such as oil floating on the surface of a body of water comprising;
   a burner having a body submergible in the water below the oil,
   sound generating means including a transducer carried by the body for producing high frequency acoustic vibrations,
   a velocity transformer carried by the body above the transducer for concentrating the acoustic vibrations at a region of maximum intensity adjacent an upper end of said transformer,
   means for adjusting the buoyancy of the body to maintain the region of maximum intensity above the surface of the water and the oil thereon, and
   an ignition system including a spark-producing device mounted on the body to project upwardly into igniting contact with a cloud of the oil atomized over the velocity transformer by operation of the sound generating means.

2. Apparatus as claimed in claim 1, in which said transducer comprises a plurality of piezoelectric ceramic plates forming a column and being interconnected to be simultaneously energized.

3. Apparatus for removing an oil slick from a body of water comprising;
   a raft towable through the oil slick, said raft having enclosing members of substantially negative buoyancy defining an open space,
   a plurality of burners connected together in spaced relation and secured to the enclosing members to extend across the open space, said burners each having a body,
   sound generating means carried by each body and including a transducer formed of a column of piezoelectric ceramic plates electrically connected together to be simultaneously energized whereby to propagate high frequency acoustic vibrations,
   a velocity transformer carried by each body above the transducer for concentrating the acoustic vibrations at a region of maximum intensity near and upper end of said transformer,
   means for adjusting the buoyancy of each burner to maintain the region of maximum intensity thereof a predetermined distance above the surface of the water, and
   an ignition system including a spark-producing device mounted on each body to project upwardly into igniting contact with a cloud of oil droplets atomized over the burner by simultaneous operation of the sound generating means.

4. A method of burning a liquid hydrocarbon such as oil contaminating the surface of a body of water comprising the steps of;
   submerging a device for producing ultrasonic vibrations in the water below a slick of the oil,
   mounting a velocity transformer in operative relation to the device and so that a region of maximum intensity provided by the velocity transformer is spaced a predetermined distance above the water surface,
   energizing the device to feed the oil upwardly of the velocity transformer to the region of maximum intensity and thereby vaporize a portion of the oil slick to create a low-lying cloud of oil droplets, and
   igniting the cloud to consume the oil slick by the continuous feeding, vaporizing and burning process.

5. A method as claimed in claim 4, and including the additional steps of assembling a plurality of the devices as a raft, and towing the raft back and forth through the oil slick.

6. Apparatus for burning a liquid hydrocarbon such as oil floating on the surface of a body of water comprising:
   a burner having a body submergible in the water below the oil,
   sound generating means including a transducer carried by the body for producing high frequency acoustic vibrations,
   a velocity transformer carried by the body above the transducer for concentrating the acoustic vibrations at a region of maximum intensity adjacent an upper end of said transformer, said velocity transformer being an electrical conductor,
   means for adjusting the buoyancy of the body to maintain the region of maximum intensity above the surface of the water and the oil thereon, and
   an ignition system including a spark-producing device mounted on the body to project upwardly into igniting contact with a cloud of oil atomized over the velocity transformer by operation of the sound generating means, said ignition system including means electrically charging the velocity transformer to a polarity opposite that of the spark-producing device whereby electrostatic and acoustic forces are produced to drive the oil upwardly as finely divided particles.

7. Apparatus as claimed in claim 6, in which said velocity transformer is a truncated cone having an outer surface provided with circumferentially spaced grooves extending into the upper end of said transformer.

8. Apparatus as claimed in claim 7, in which said upper end of the velocity transformer is dished to contain a quantity of oil delivered thereto mainly from the circumferentially spaced grooves.

* * * * *